US012584989B2

(12) United States Patent
Shain et al.

(10) Patent No.: US 12,584,989 B2
(45) Date of Patent: Mar. 24, 2026

(54) SYSTEMS AND METHODS FOR ASSOCIATING RF SIGNALS WITH AN INDIVIDUAL

(71) Applicant: HONEYWELL INTERNATIONAL INC., Charlotte, NC (US)

(72) Inventors: Chaim Shain, Parkland, FL (US); Yuri Novozhenets, Pittsford, NY (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 441 days.

(21) Appl. No.: 18/186,282

(22) Filed: Mar. 20, 2023

(65) Prior Publication Data

US 2023/0305097 A1     Sep. 28, 2023

Related U.S. Application Data

(60) Provisional application No. 63/269,715, filed on Mar. 22, 2022.

(51) Int. Cl.
*G01S 5/02*       (2010.01)
*G01S 13/04*      (2006.01)
*H04W 64/00*      (2009.01)

(52) U.S. Cl.
CPC .......... *G01S 5/02524* (2020.05); *G01S 13/04* (2013.01); *H04W 64/003* (2013.01)

(58) Field of Classification Search
CPC ... G01S 5/02524; G01S 13/04; H04W 64/003
See application file for complete search history.

(56) References Cited

U.S. PATENT DOCUMENTS

| | | | |
|---|---|---|---|
| 7,081,818 B2 | 7/2006 | Eckstein et al. | |
| 8,072,311 B2 | 12/2011 | Sadr et al. | |
| 9,036,028 B2 | 5/2015 | Buehler | |
| 9,503,620 B2 | 11/2016 | Konrad et al. | |
| 9,703,274 B2 | 7/2017 | Li | |
| 9,852,319 B1 | 12/2017 | Pesavento et al. | |
| 10,156,852 B2 | 12/2018 | Bakhishev et al. | |
| 10,295,964 B2 | 5/2019 | Ray et al. | |
| 10,410,300 B2 | 9/2019 | Bentz et al. | |
| 10,448,006 B2 | 10/2019 | Caicedo Fernandez et al. | |
| 10,605,905 B2 | 3/2020 | Bermudez et al. | |

(Continued)

FOREIGN PATENT DOCUMENTS

| | | |
|---|---|---|
| CN | 109918959 A | 6/2019 |
| EP | 3237811 B1 | 1/2021 |

(Continued)

*Primary Examiner* — Justin Y Lee

(74) *Attorney, Agent, or Firm* — Seager, Tufte & Wickhem, LLP

(57) ABSTRACT

Systems and methods for determining occupancy. In some embodiments, a system comprises at least one processor and memory storing instructions executable by the at least one processor, the instructions when executed cause the system to: obtain information related to presence of a user within a space; obtain information related to one or more RF signals within the space; associate the one or more RF signals with the user based on the information related to presence of the user and information related to the one or more RF signals; and determine presence of the user based on the association of the user with the one or more RF signals.

13 Claims, 6 Drawing Sheets

400 ⟍

OBTAINING INFORMATION RELATED TO PRESENCE OF A USER WITHIN A SPACE <u>402</u>

OBTAINING INFORMATION RELATED TO ONE OR MORE RF SIGNALS WITHIN THE SPACE <u>404</u>

ASSOCIATING ONE OR MORE RF SIGNALS WITH THE USER <u>406</u>

DETERMINE PRESENCE OF THE USER <u>408</u>

(56)     References Cited

U.S. PATENT DOCUMENTS

| | | | |
|---|---|---|---|
| 10,621,840 B2 | 4/2020 | Garg et al. | |
| 10,719,698 B2 | 7/2020 | Holliday et al. | |
| 10,733,862 B2 | 8/2020 | Huang et al. | |
| 10,832,508 B2 | 11/2020 | Novozhenets et al. | |
| 10,991,220 B2 | 4/2021 | Shakedd et al. | |
| 11,030,902 B2 | 6/2021 | Bakhishev et al. | |
| 11,037,067 B2 | 6/2021 | Holliday et al. | |
| 11,047,588 B2 | 6/2021 | Zhao et al. | |
| 11,184,739 B1 | 11/2021 | Wellig et al. | |
| 11,204,616 B2 | 12/2021 | Baker et al. | |
| 2018/0320916 A1 | 11/2018 | Vincitore et al. | |
| 2019/0354074 A1 | 11/2019 | Clair et al. | |
| 2021/0041523 A1* | 2/2021 | Murthy | G01S 7/417 |
| 2021/0136617 A1 | 5/2021 | Zou et al. | |
| 2021/0325839 A1 | 10/2021 | Hu et al. | |

FOREIGN PATENT DOCUMENTS

| WO | 2017120262 A1 | 7/2017 |
|---|---|---|
| WO | 2019114962 A1 | 6/2019 |
| WO | 2021105111 A1 | 6/2021 |
| WO | 2021194944 A1 | 9/2021 |

* cited by examiner

100

200

ASSOCIATION MODULE 250

MACHINE LEARNING SYSTEM 254

OBTAINING INFORMATION RELATED TO PRESENCE OF A USER WITHIN A SPACE <u>402</u>

OBTAINING INFORMATION RELATED TO ONE OR MORE RF SIGNALS WITHIN THE SPACE <u>404</u>

ASSOCIATING ONE OR MORE RF SIGNALS WITH THE USER <u>406</u>

DETERMINE PRESENCE OF THE USER <u>408</u>

SYSTEMS AND METHODS FOR ASSOCIATING RF SIGNALS WITH AN INDIVIDUAL

CROSS REFERENCE TO A RELATED APPLICATION

The application claims the benefit of U.S. Provisional Application No. 63/269,715 filed Mar. 22, 2022, the contents of which are hereby incorporated in their entirety.

BACKGROUND

The invention relates generally to determining occupancy and, more specifically, to determining occupancy using association of radio frequency (RF) signals with an individual.

Generally, multiple sensing methods may be needed to assess occupancy within a space with some level of accuracy. One sensing method may not provide sufficient coverage, fidelity, and/or resolution of information. In some cases, specialized sensors may be used for determining occupancy and/or density. However, these specialized sensors may be costly and their coverage may lack accuracy.

BRIEF DESCRIPTION

Aspects of the disclosure relate to methods, apparatuses, and/or systems for determining occupancy using association of RF signals with an individual.

In some embodiments, a system for determining occupancy comprises at least one processor and memory storing instructions executable by the at least one processor, the instructions when executed cause the system to: obtain information related to presence of a user within a space; obtain information related to one or more RF signals within the space; associate the one or more RF signals with the user based on the information related to presence of the user and information related to the one or more RF signals; and determine presence of the user based on the association of the user with the one or more RF signals.

In some embodiments, associating the one or more RF signals with the user is based on the space and wherein the instructions when executed cause the system to associate the one or more RF signals with the user and the space.

In some embodiments, the instructions when executed cause the system to determine presence of the user in a given space in a given time based on detecting the one or more RF signals.

In some embodiments, the system comprises one or more sensors configured to output signals conveying information related to the user, and wherein the instructions when executed cause the system to: detect presence of the user within the space based on the output signals; and associate the one or more RF signals with the user based on the detected presence.

In some embodiments, the one or more sensors are configured to output signals conveying information related to RF signals within the space, and wherein the instructions when executed cause the system to: detect one or more RF signals within the space based on the output signals; and associate the one or more RF signals with the user based on the detected RF signals.

In some embodiments, the instructions cause the system to detect the one or more RF signals responsive to detecting the user within the space.

In some embodiments, the RF signals are emitted by one or more user devices.

In some embodiments, the instructions cause the system to assign a weight factor to the RF signals based on a type of the user device emitting the RF signals; and determine presence of the user based on the weighted RF signals.

In some embodiments, a method for determining occupancy, the method being implemented in a computing system comprising at least one processor and memory storing instructions, the method comprises: obtaining information related to presence of a user within a space; obtaining information related to one or more RF signals within the space; associating the one or more RF signals with the user based on the information related to presence of the user and information related to the one or more RF signals; and determining presence of the user based on the association of the user with the one or more RF signals.

In some embodiments, a system for determining occupancy comprises one or more sensors configured to output signals conveying information related to a user and information related to one or more RF signals within a first space; at least one processor; and memory storing instructions executable by the at least one processor, the instructions when executed cause the system to: detect presence of the user within the first space based on the output signals; detect one or more RF signals within the first space based on the output signals; associate an RF signal from the detected one or more RF signals with the detected user, the RF signal being emitted by a user device of the user; and determine presence of the user in a second space based on detecting the RF signal in the second space.

Various other aspects, features, and advantages of the invention will be apparent through the detailed description of the invention and the drawings attached hereto. It is also to be understood that both the foregoing general description and the following detailed description are examples and not restrictive of the scope of the invention.

BRIEF DESCRIPTION OF THE DRAWINGS

The subject matter, which is regarded as the disclosure, is particularly pointed out and distinctly claimed in the claims at the conclusion of the specification. The following descriptions of the drawings should not be considered limiting in any way. With reference to the accompanying drawings, like elements are numbered alike:

FIG. 1 shows an example of a system for determining occupancy using machine learning assisted association of RF signals with an individual, in accordance with one or more embodiments.

FIG. 2 shows examples of a training system, in accordance with one or more embodiments.

DETAILED DESCRIPTION

Figure 1:
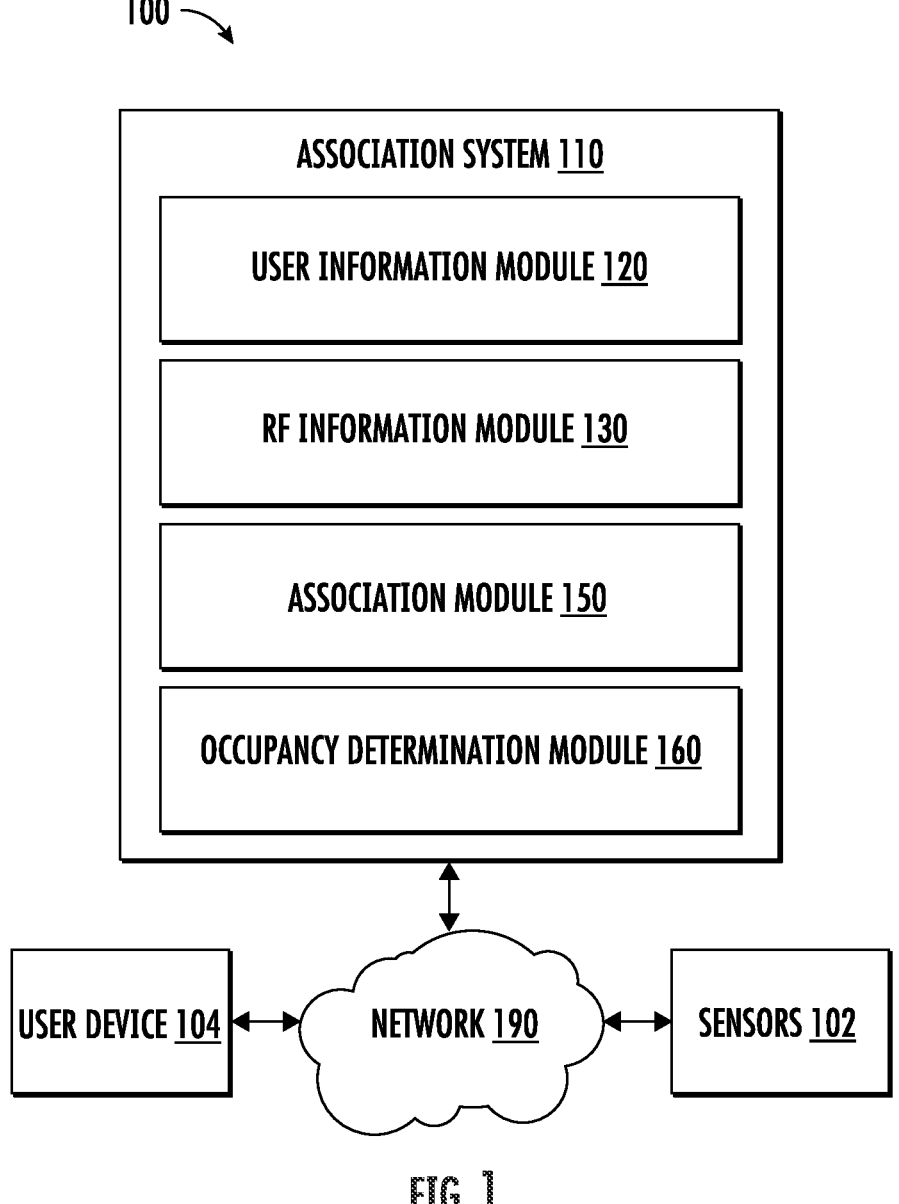
FIG. 1-A shows an example of a system for determining occupancy within a space, in accordance with one or more embodiments.
Figure 1A:
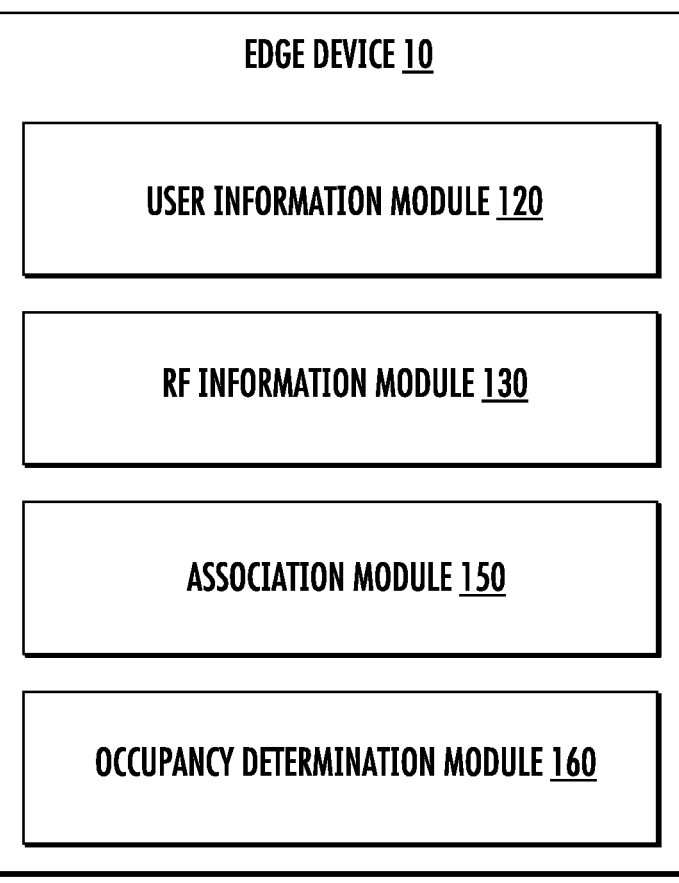

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

The present disclosure provides a system 100 for association of wireless signals (e.g., RF signals) with individuals. In some embodiments, system 100 may be configured to determine occupancy within a space based on detected wireless signals. In some embodiments, system 100 may be configured to determine presence of an individual based association between detected wireless signals and the individual (e.g., over time). Determining presence within a space may help understand occupancy and density within the space which in turn may help optimize utilization of resources within the space (e.g., cooling, heating, lighting, energy, security, scrubbing, workspace allocation, hoteling, and/or other building resources for the space). In some embodiments, presence, occupancy, and/or density determined based on association of wireless signals and individuals may be used to automatically adjust allocation of resources and/or control parameters of building management systems. In some cases, determining occupancy may help management of rescue resources in cases of emergencies (e.g., fires, biohazards, or other types of emergencies).

In some embodiments, information from sensors, user devices, access devices, access control systems, edge devices, and/or other components within or outside system 100 may be used to associate detected wireless signals and individuals. Association of wireless signals and individuals may in turn be used to determine presence and occupancy within a space. This may be advantageous because it may reduce the need for specialized density and occupancy sensors which may be costly and lack in accuracy in some cases. Instead, system 100 takes advantage of existing components (cameras, wireless signal readers, user devices, access devices, access control systems, edge devices, etc.) to associate wireless signals and individuals. That said, density and/or occupancy sensors may be used with system 100 and are compatible with the present disclosure. For example, in some embodiments, information from density and/or occupancy sensors may be used where user and/or wireless information is not available (e.g., in a space where the user and/or the wireless signal cannot be detected). In some embodiments, information from the density and/or occupancy sensors may be used as a feedback in the association process (e.g., to confirm presence that was determined using detected wireless signals).

In some embodiments, system 100 may be configured to train association models to associate wireless signals with individuals. The trained association models may be used to determine presence of an individual based on detected signals. In some embodiments, the association learning models may be automatically trained (unsupervised learning). The association learning models of system 100 may be configured to dynamically adapt and adjust to different conditions by continuously iterating and self-learning and without having to go through supervised learning (which may be time consuming and costly). This may be beneficial, because the association models are constantly self-learning and do not need to be retrained (e.g., each time a user starts or stops using a user device). That said, not all embodiments necessarily provide all of these benefits, and some embodiments may provide other distinct advantages, which is not to suggest that any other feature described herein may not also be omitted in some embodiments.

FIG. 1 shows an example of a system 100 for determining presence, in accordance with one or more embodiments. In some embodiments, system 100 may include an occupancy system 110, one or more sensors 102, a user device 104, and/or other components. Other components known to one of ordinary skill in the art may be included in system 100 to gather, process, transmit, receive, acquire, and provide information used in conjunction with the disclosed embodiments. In addition, system 100 may further include other components that perform or assist in the performance of one or more processes that are consistent with disclosed embodiments. For example, one or more embodiments described herein may be implemented in an edge device configured for providing control of data flow between networks. FIG. 1-A shows an example of an edge device 10 configured for performing one or more embodiments of the present disclosure. The edge device may be configured to perform or assist in the performance of one or more embodiments described herein (e.g., receive, process, store, or transmit information used in conjunction with the disclosed embodiments). The edge device may include other components (e.g., one or more components of system 100, or other components) to assist in the performance of the disclosed embodiments.

Sensors 102, in some embodiments, may be configured to generate output signals conveying information related to a user (e.g., an individual), a user device, a space, wireless signals within a space, and/or other sensor information. For example, in some embodiments, sensor information may be used to detect a user within a space (e.g., a door, a structure, a building, a section of a building, a garage, a room, a vehicle, etc.) In some embodiments, sensor information provided by sensors 102 may be used to detect one or more user devices (e.g., by detecting one or more signals emitted by the user devices). In some embodiments, sensor information may be used to train machine learning models to associate the user with one or more signals emitted by the user device.

In some embodiments, sensors 102 may include optical sensors configured to generate one or more image data. The image data, in some embodiments, may be used to detect individuals. In some embodiments, system 100 may use the image data obtained by the sensors to associate the detected individuals with signals emitted from user devices. In some embodiments, system 100 may use the image data obtained by the sensors to train the association models to associate the detected individuals with signals emitted from user devices. The optical sensors, in some embodiments, may include one or more of an image or video camera, thermographic sensor, a depth sensor, a scanner, a LIDAR sensor, a RADAR sensor, a 3D camera, an infrared light sensor, a hyperspectral imager, multispectral imager, and/or other sensors. In some embodiments, sensor data obtained from sensors 102 may be processed (e.g., using processors 510 described herein with reference to FIG. 5) to extract image information. In some embodiments, computer vision techniques may be used to extract information. In some embodiments, the processors may be included in the sensors. In some embodiments, the sensor data obtained by sensors 102 may include images, videos, multi-dimensional depth images, thermal images, infrared light measurements, light reflection time measurements, radio wave measurements, range, angle, and/or other sensor data. In some embodiments, a plurality of sensor data from a plurality of sensors of sensors 102 may be combined to extract the information. For example, images from different locations and angles, multi-dimensional depth images, thermal images, ranges, angles, and/or other image data obtained from sensors 102 may be combined to provide information about the user, the user devices, the wireless signals, and/or the space.

In some embodiments, sensors 102 may include wireless signal readers (e.g., transceivers) configured for detecting wireless signals emitted or transmitted by one or more user devices. For example, sensors 102 may be configured to detect radio frequency (RF) signals (e.g., Bluetooth, BLE, Wi-Fi, Zigbee, or other RF signals) emitted by one or more user devices. In some embodiments, the RF signals detected by sensors 102 may be associated with a user to create an RF user signature.

It is to be understood that sensors 102 described here are not intended to be limiting, other types of sensors may be used and are consistent with the present disclosure. For example, in some embodiments, sensors 102 may include one or more of an accelerometer, a location sensor, a global positioning system (GPS) sensor, a position sensor, a pedometer, a motion detector, an audio sensor, gas sensors, or other sensors for providing user, user device, wireless signals, or space related information. In some embodiments, density and/or occupancy sensors may be used to provide presence information. As explained above, information from density and/or occupancy sensors may be used where user and/or wireless information is not available (e.g., in a space where the user and/or the wireless signal cannot be detected). In some embodiments, information from the density and/or occupancy sensors may be used as a feedback in the association learning process (e.g., to confirm presence that was determined using detected wireless signals).

Furthermore, other type of information may be obtained from sensors 102 and maybe used to associate a wireless signal (e.g., RF signal) with the user. For example, in some embodiments, the sensors' information may include behavioral information of the user that may be used to detect or identify a user within a space. For example, the behavioral information may include movement characteristics of the user (e.g., gait, coordination, walking speed, number of steps taken, pace, manner, and pattern of walking, or other movement characteristics); motion, position, or orientation of one or more body parts of the user (e.g., gesture, facial expression, eye movement, head position, etc.); and/or other behavioral information. In some embodiments, the sensors' information may include physiological information of the user that may be used to detect (or identify) a user within a space (e.g., body temperature, heart rate, pulse, breathing parameters, or other physiological parameters. In some embodiments, the sensors information may include biometric information of the user that may be used to detect (or identify) the user (e.g., fingerprints, height, hair, eye, body, gender, race, age, facial, voice characteristics, or other biometric characteristics). In some embodiments, the sensors' information may include identifying information of the user that may be used to detect or identify a user within a space (e.g., username, ID, access credentials, access levels, passwords, codes, etc.).

In some embodiments, information related to the user, user device, wireless signals, and/or the space may be obtained from other components within or outside of system 100. In some embodiments, these components may be configured to provide some or all of the processing capabilities to the one or more sensors and/or communicate sensor data to occupancy system 110. For example, in some embodiments, system 100 may be configured to receive information from one or more access control devices used for controlling access to the space (e.g., access control devices for a door, a structure, a building, a section in a building, a room, a vehicle, etc.). In some embodiments, one or more sensors 102 (described herein) may be included in an access control device. For example, one or more of an optical sensor, an RF reader, a biometric reader, a proximity sensor, motion sensor, and/or other sensors may be included in an access control device.

In some embodiments, system 100 may be configured to receive information from an access control system used to provide administration functions to control access devices (e.g., controlling, programming, monitoring, authenticating, exchanging information, etc.). In some embodiments, the access control system may be configured to provide access control information related to the user (e.g., access credentials, identification, or authentication information for the user). In some embodiments, the access control information may include information related to access events. For example, the access events information may include details about events when the user accessed a controlled area (e.g., time, credentials used, access granted/denied, etc.). In some embodiments, the access control system may provide access events information to occupancy system 110 to determine association of an individual with wireless signals. Information from the access control system may serve as feedback to the occupancy system 100 (to confirm presence of the user and/or the user device in the space). These and other information may be used to determine presence, confirm presence, and/or improve the confidence level of occupancy within a space (e.g., scheduling information, access levels, prior authentication events, etc.). In some embodiments, occupancy system 110 may use the access events information to train machine learning association models using the events where the user accessed the space.

User device 104 may include any device capable of emitting or transmitting wireless signals (e.g., RF, NFC, BLE, BTLE, Wi-Fi, Ultra-wideband (UWB), or other wireless communications technologies). In some embodiments, user devices 104 may include any devices associated with the user that are capable of communicating with one or more components within or outside system 100 using wireless communication technologies (e.g., mobile phone, a wearable computing device, smart watches, headphones, a tablet, a laptop, smart access cards, etc.). In some embodiments, user device 104 may include one or more of sensors 102 (described herein). For example, user device 104 may include one or more of an accelerometer, a pedometer, a location sensor, GPS, proximity, motion, and/or other sensors. In some embodiments, user device 104 may be configured to provide some or all of the processing capabilities to the one or more sensors. In some embodiments, user device 104 may be configured to communicate sensor data to occupancy system 110 or other to other components of system 100.

Occupancy system 110, in some embodiments, may include user information module 120, RF information module 130, association module 150, occupancy determination module 160, and/or other components. In some embodiments, occupancy system 110 may include computing resources such as processors and memory devices for storing instructions (e.g., computing system 500 described herein below with reference to FIG. 5). The processors may be configured to execute software instructions to perform various operations of system 100. The computing resources may include software instructions to perform operations of modules 120, 130, 150, 160, and/or other components of systems 110 and 100.

User information module 120 may be configured to obtain (or determine) information related to one or more users. For example, in some embodiments, user information module 120 may obtain the user information from sensors 102. In other embodiments, the user information may be obtained from a user device, an access device, an access control system, an edge device, and/or other components within or outside system 100. In some embodiments, user information module 120 may be configured to determine presence of the user based on output signals from sensors 102 indicating presence of the user (e.g., image data, accelerometer, location, GPS, position, motion, and/or other sensor information). For example, in some embodiments, user information module 120 may detect presence of a user based on image data (from an image sensor 102) indicating presence. In some embodiments, user information module 120 may determine presence of the user based on physiological, biometric, behavioral, or identifying information of the user.

In some embodiments, RF information module 130 may be configured to obtain wireless signals detected within a space. In some embodiments, the wireless signals may include RF signals emitted or transmitted by one or more user devices. For example, RF information module 130 may be configured to obtain RF signals (e.g., Bluetooth, BLE, Wi-Fi, Zigbee, or other RF signals) detected by sensors 102.

In some embodiments, association module 150 may be configured to associate one or more detected RF signals with one or more detected users. For example, if a user is detected in a space, association module 150 may associate the RF signals detected within the space with the user. In this case, if one or more of the RF signals are detected in a different location, this may indicate that the user may be present in that location. In some embodiments, association module 150 may be configured to assign a different weighing factor to the different wireless signals associated with a user. For example, by applying a weighing factor based on the type of wireless signal detected and/or the type of user devices emitting the signals. For example, association module 150 may be configured to assign a weighing factor to signals coming from a wearable device (e.g., a smart watch, headphones, etc.). Signals from a mobile device (e.g., phones) may be weighted lower than the signals from the wearable devices, and signals form other user devices (e.g., laptops) may be weighted even lower.

The weighing factor may be used to increase or decrease the confidence level of the user presence in a given space. In other words, the user is more likely to be in the location where the smartwatch signals are detected than he is to be in the location where the laptop is. Determining the confidence level step may be accomplished by occupancy module 160 or by association module 150. In some embodiments, association module 150 may be configured to associate one or more of the detected wireless signals with the detected user responsive to the signals reaching a weighing factor threshold. For example, only signals form the wearable devices and the mobile devices may be associated with the user (for determining presence) because they are assigned higher weighing factors. In these cases, the other detected wireless signals are not associated with the detected user and are not relied on for determining presence of the user. In some embodiments, association module 150 or occupancy determination module 160 may rely on other information to increase or decrease the confidence level of the user being present in a given space in a given time. For example, scheduling, authentication, access levels information may be used to increase or decrease the confidence level of the user presence.

In some embodiments, association module 150 may be configured to adjust association of detected wireless signals with detected users over time. In some embodiments, the adjustment may be based on a plurality of instances of detection within the same space over time. In some embodiments, the adjustment may be based on a plurality of instances of detection within different spaces. For example, in some embodiments, association module 150 may associate multiple signals to a user as a response to detecting the user and the signals in a given space (e.g., an office). Association module 150 may adjust (e.g., increase or decrease) the signals associated with this user based on subsequent detections in the same space (e.g., over time). In other cases, association module 150 may adjust (e.g., increase or decrease) the signals associated with this user based on subsequent detections in different locations.

In some embodiments, in case multiple users are detected along with multiple wireless signals, association module 150 may be configured to associate one or more signals to individual users based on other instances of detection (of the signals and the users) within the same space or in other spaces. In other words, signals that are detected at the same time as a user in multiple locations (or in the same location at different times) are associated with that user, and the other signals are filtered out.

In some embodiments, the user information obtained by user information module 120 and wireless information obtained by RF signal module 130 may be input into a machine learning system, of association module 150, configured to train one or more association models to associate one or more RF signals with a user. In some embodiments, the association models may be used (e.g., by presence determination module 160) to determine presence of an individual based on detected signals. In some embodiments, the association learning models may be automatically trained (unsupervised learning) to associate one or more RF signals with a user based on information from sensors 102 (e.g., detection of users and wireless signals in a given space). In some embodiments, the association learning models may be configured to dynamically adjust by continuously iterating and self-learning and without having to go through supervised learning (which may be time consuming and costly). For example, the association learning models may be configured to dynamically adjust to changes of user behavior (e.g., the user starts carrying more or less user devices).

Figure 2:
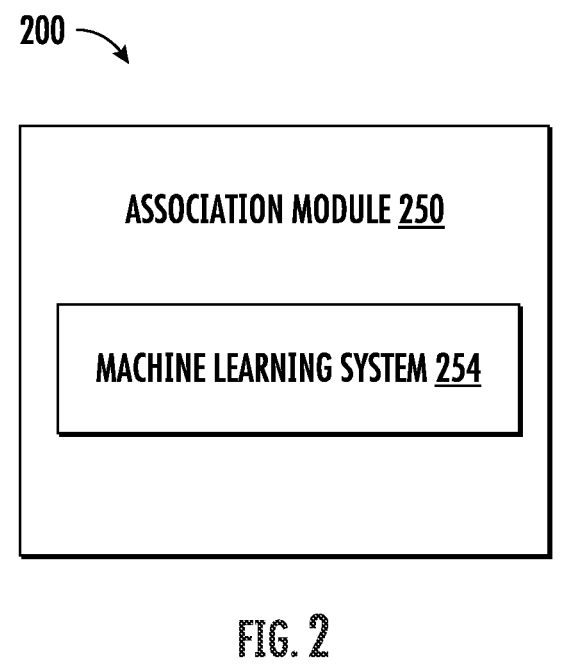

FIG. 2 shows an example operations 200 of a training system, in accordance with one or more embodiments of the present disclosure. In some embodiments, association module 250 may include a machine learning system 254 configured to train one or more association models to associate one or more RF signals with a user (e.g., deep learning models). In some embodiments, the machine learning system 254 uses unsupervised learning algorithms to train one or more association models. In some embodiments, unsupervised learning algorithms of machine learning system 254 may be configured to receive user information and wireless signals information as input. The input data is not labeled, classified, or categorized. In some embodiments, the unsupervised learning algorithms of machine learning system 254 may be configured to identify similarities in the input data and to group new data based on presence or absence of the identified similarities. In some embodiments, using unsupervised learning algorithms may be beneficial because it may allow for discovering hidden trends and patterns, or extracting data features from the input data that would have been difficult to obtain if other techniques were used. For example, the trained association model may be able to associate signals with users based on a high number of detection instances over time or in different locations.

It is to be understood that the machine learning systems are described here as examples for techniques for associate one or more RF signals with a user. However, other techniques, are also contemplated by the present disclosure. As such, any computer implemented techniques, or machine learning techniques for identifying a user based on the user attributes are contemplated by the present disclosure. For example, machine learning system 254 may implement any type of machine learning technique to associate the wireless signals with the user as described herein. Machine learning system 254 may use one or more of supervised learning, semi-supervised, unsupervised learning, reinforcement learning, and/or other machine learning techniques). In some embodiments, the machine learning models may include decision trees, support vector machines, regression analysis, Bayesian networks, random forest learning, dimensionality reduction algorithms, boosting algorithms, artificial neural networks (e.g., fully connected neural networks, deep convolutional neural networks, or recurrent neural networks), deep learning, and/or other machine learning models.

Figure 3:
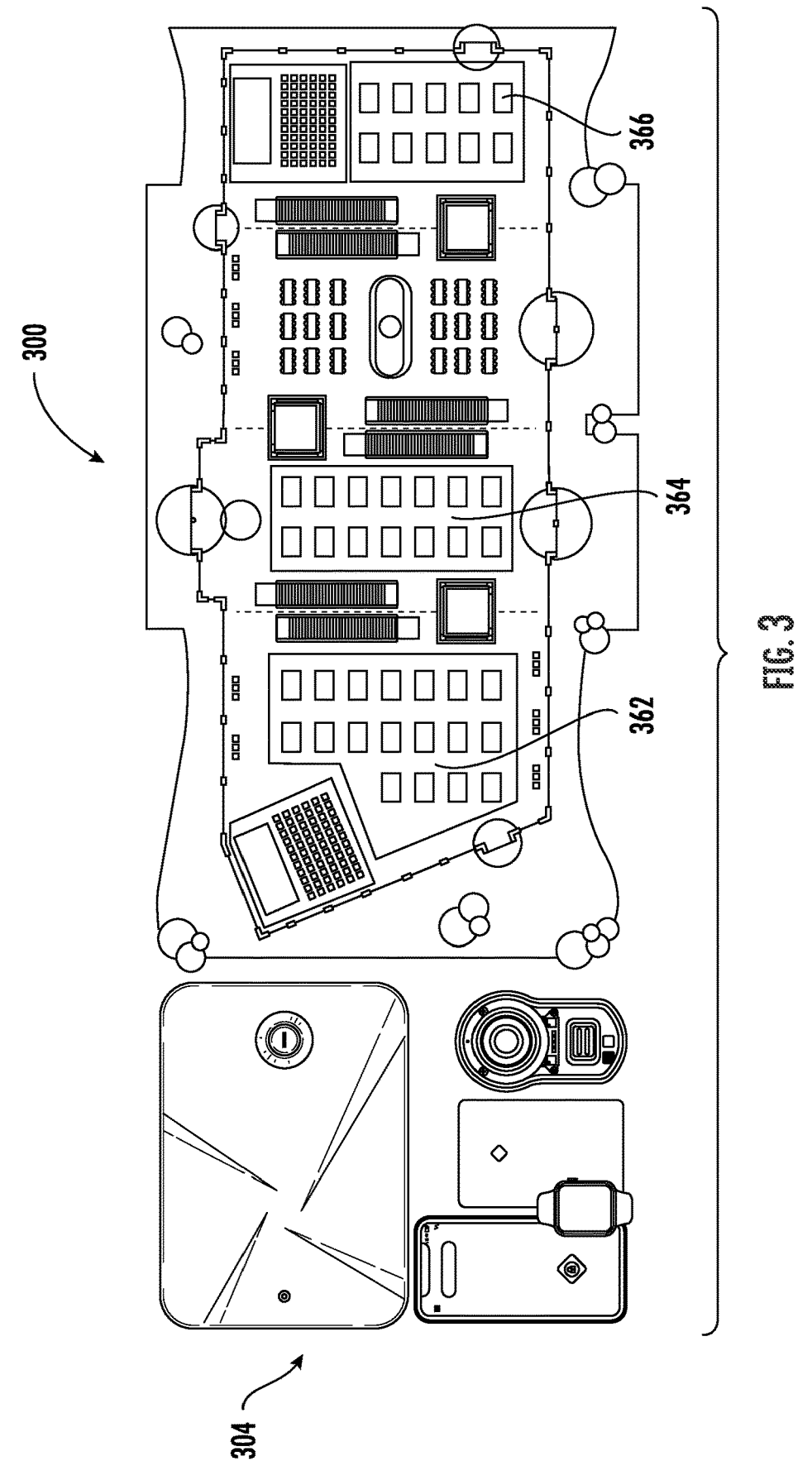
FIG. 3 shows an example of an occupancy map, in accordance with one or more embodiments.

Returning to FIG. 1, occupancy determination module 160 may be configured to determine presence of one or more individuals (users) based on the detected wireless signals. In some embodiments, occupancy determination module 160 may be configured to use association information received from association module 150 in determining presence of an individual (or occupancy of a space). In some embodiments, occupancy determination module 160 may be configured to determine occupancy based on the weighing factors of the detected wireless signals. In some embodiments, presence determination module 160 may use the trained association models to determine presence. FIG. 3 shows an example of an occupancy map according to one or more embodiments. Map 300 shows one or more areas of occupancy (e.g., 362, 364, 366) based on wireless signals emitted form user device 304. As explained above, this may help better management of occupied spaces from comfort to air quality and environmental health. Determining occupancy may also help optimize efficiency of overall building resources (e.g., cooling, heating, lighting, energy allocation, scrubbing, workspace allocation, hoteling, etc.). In some cases, determining occupancy may help better management of rescue resources in cases of emergencies (e.g., fires, biohazards, or other types of emergencies).

In some embodiments, one or more components of system 100 may communicate directly through one or more dedicated communication links. In some embodiments system 100 may include a network 190 connecting one or more components of system 100. In some embodiments, network 190 may be any type of network configured to provide communications between components of system 100. For example, network may be any type of wired or wireless network (including infrastructure) that provides communications, exchanges information, and/or facilitates the exchange of information, such as the Internet, near field communication (NFC), optical code scanner, cellular network, a public switched telephone network ("PSTN"), text messaging systems (e.g., SMS, MMS), frequency (RF) link, Bluetooth®, Wi-Fi, a private data network, a virtual private network, a Wi-Fi network, a LAN or WAN network, or other suitable connections that enables the sending and receiving of information between the components of system 100. It will be appreciated that this is not intended to be limiting and that the scope of this disclosure includes implementations in which the client one or more components of system 100 are operatively linked via some other communication media.

It should be appreciated that the illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g., within a data center or geographically), or otherwise differently organized. The functionality described herein may be provided by one or more processors of one or more computers executing code stored on a tangible, non-transitory, machine readable medium.

Figure 4:
FIG. 4 shows a flow diagram illustrating an example of a method for determining occupancy within a space, in accordance with one or more embodiments.
Figure 4:
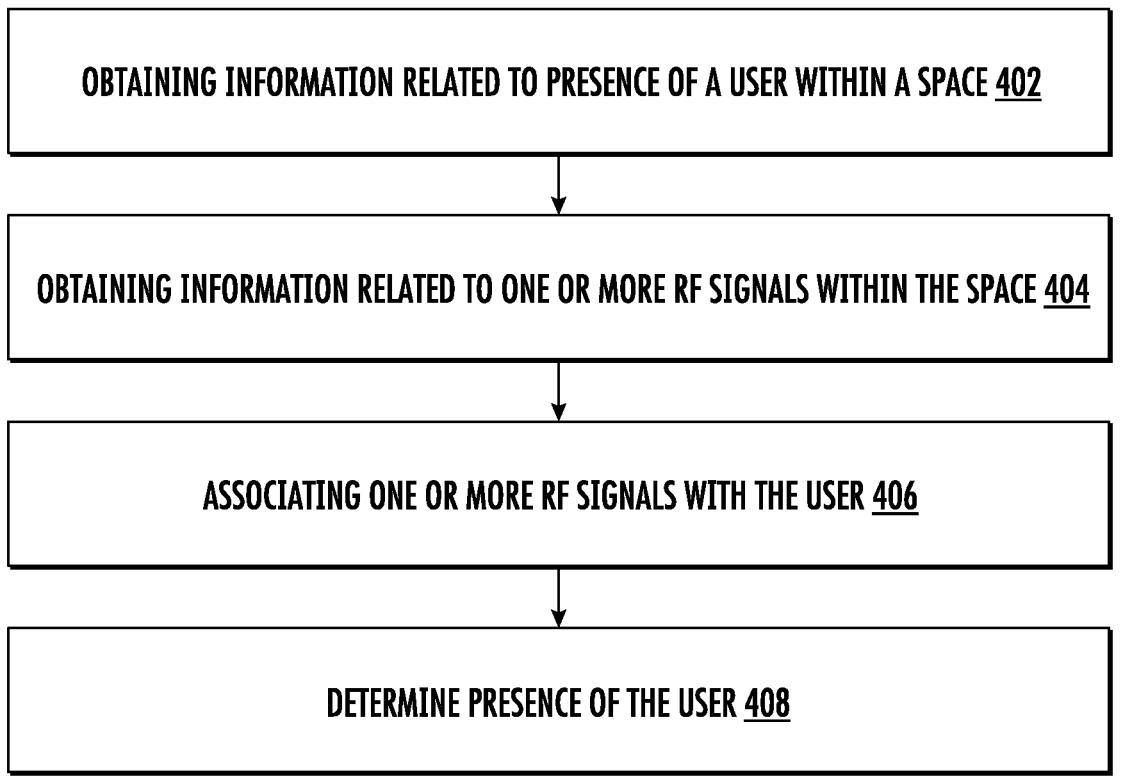

FIG. 4 illustrates a method 400 for determining occupancy within a space, in accordance with one or more embodiments of the present disclosure. The operations of method 400 presented below are intended to be illustrative. In some implementations, method 400 may be accomplished with one or more additional operations not described and/or without one or more of the operations discussed. Additionally, the order in which the operations of method 400 are illustrated in FIG. 4 and described below is not intended to be limiting.

In some embodiments, the methods may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the method.

At an operation 402 of method 400, information related to presence of a user within a space may be obtained. In some embodiments, operation 402 may be performed by user information module, the same as or similar to user information module 120 (shown in FIG. 1 and described herein).

At an operation 404 of method 400, information related to one or more RF signals within the space may be obtained. In some embodiments, operation 404 may be performed by a RF information module, the same as or similar to RF information module 130 (shown in FIG. 1 and described herein).

At an operation 406 of method 400, the one or more RF signals may be associated with the user based on the information related to presence of the user and information related to the one or more RF signals. In some embodiments, operation 406 may be performed by an association module, the same as or similar to association module 150 (shown in FIG. 1 and described herein).

At operation 408 of method 400, presence of the user may be determined based on the association of the user with the one or more RF signals. In some embodiments, operation 408 may be performed by an occupancy module, the same as or similar to occupancy module 160 (shown in FIG. 1 and described herein).

Figure 5:
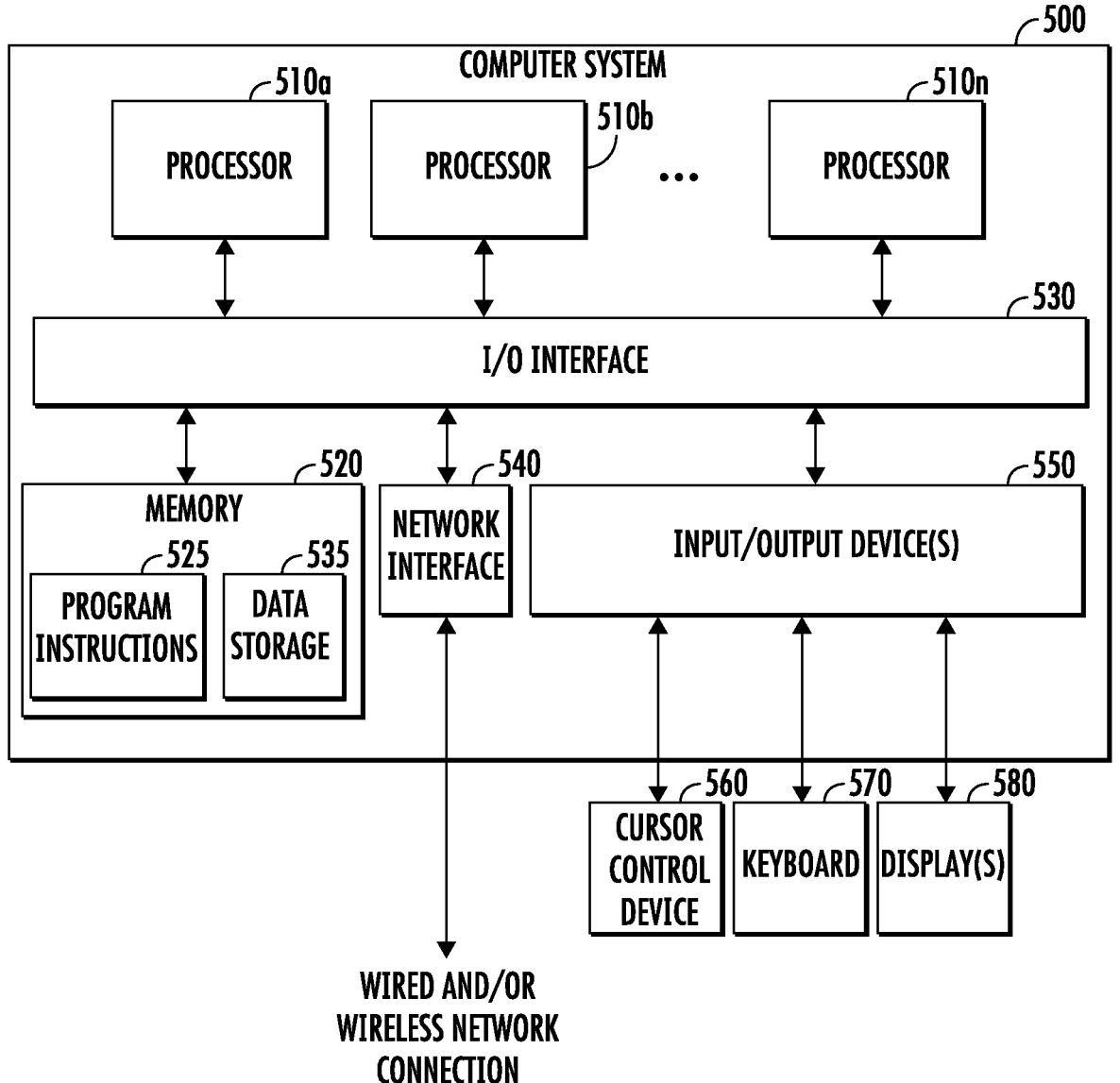
FIG. 5 shows an example of a computer system that may be used to implement aspects of the techniques described herein.

Embodiments of one or more techniques of the present disclosure as described herein may be executed on one or more computer systems, which may interact with various other devices. One such computer system is illustrated by FIG. 5. FIG. 5 shows an example of a computer system that may be used to implement aspects of the techniques described herein. In different embodiments, computer system 500 may include any combination of hardware or software that can perform the indicated functions, including, but not limited to, a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or other type of computing or electronic device.

In the illustrated embodiment, computer system 500 includes one or more processors 510 coupled to a system memory 520 via an input/output (I/O) interface 530. Computer system 500 further includes a network interface 540 coupled to I/O interface 530, and one or more input/output devices 550, such as cursor control device 560, keyboard 570, and display(s) 580. In some embodiments, it is contemplated that embodiments may be implemented using a single instance of computer system 500, while in other embodiments multiple such systems, or multiple nodes making up computer system 500, may be configured to host different portions or instances of embodiments. For example, in one embodiment some elements may be implemented via one or more nodes of computer system 500 that are distinct from those nodes implementing other elements.

In various embodiments, computer system 500 may be a uniprocessor system including one processor 510, or a multiprocessor system including several processors 510 (e.g., two, four, eight, or another suitable number). Processors 510 may be any suitable processor capable of executing instructions. may be comprised of semiconductor(s) and/or transistors (e.g., electronic integrated circuits (ICs)). In such a context, processor-executable instructions may be electronically executable instructions. For example, in various embodiments, processors 510 may be general-purpose or embedded processors implementing any of a variety of instruction set architectures (ISAs), such as the x86, PowerPC, SPARC, or MIPS ISAs, or any other suitable ISA. In multiprocessor systems, each of processors 510 may commonly, but not necessarily, implement the same ISA.

In some embodiments, at least one processor 510 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the image processing methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others. In some embodiments, one or more computers may include multiple processors operating in parallel. A processor may be a central processing unit (CPU) or a special-purpose computing device, such as graphical processing unit (GPU), an integrated circuit or on-chip system, an application-specific integrated circuit (ASIC), a field-programmable gate array (FPGA), a complex programmable logic device (CPLD), or application-specific integrated circuits.

System memory 520 may be configured to store program instructions and/or data accessible by processor 510. In various embodiments, system memory 520 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing desired functions, such as those described in this disclosure, are shown stored within system memory 520 as program instructions 525 and data storage 535, respectively. In other embodiments, program instructions and/or data may be received, sent, or stored upon different types of computer-accessible media or on similar media separate from system memory 520 or computer system 500. Generally speaking, a computer-accessible medium may include storage media or memory media such as magnetic or optical media, e.g., disk or CD/DVD-ROM coupled to computer system 500 via I/O interface 530. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 540.

In one embodiment, I/O interface 530 may be configured to coordinate I/O traffic between processor 510, system memory 520, and any peripheral devices in the device, including network interface 540 or other peripheral interfaces, such as input/output devices 550. In some embodiments, I/O interface 530 may perform any necessary protocol, timing, or other data transformations to convert data signals from one component (e.g., system memory 520) into a format suitable for use by another component (e.g., processor 510). In some embodiments, I/O interface 530 may include support for devices attached through various types of peripheral buses, such as a variant of the Peripheral Component Interconnect (PCI) bus standard or the Universal Serial Bus (USB) standard, for example. In some embodiments, the function of I/O interface 530 may be split into two or more separate components, such as a north bridge and a south bridge, for example. In addition, in some embodiments some or all of the functionality of I/O interface 530, such as an interface to system memory 520, may be incorporated directly into processor 510.

Network interface 540 may be configured to allow data to be exchanged between computer system 500 and other devices attached to a network, such as other computer systems, or between nodes of computer system 500. In various embodiments, network interface 540 may support communication via wired or wireless general data networks, such as any suitable type of Ethernet network, for example, via telecommunications/telephony networks such as analog voice networks or digital fiber communications networks; via storage area networks such as Fibre Channel SANs, or via any other suitable type of network and/or protocol.

Input/output devices 550 may, in some embodiments, include one or more display terminals, cursor control devices (e.g., mouse), keyboards, keypads, touchpads, touchscreens, scanning devices, voice or optical recognition devices, or any other devices suitable for entering or retrieving data by one or more computer system 500. Multiple input/output devices 550 may be present in computer system

500 or may be distributed on various nodes of computer system 500. In some embodiments, similar input/output devices may be separate from computer system 500 and may interact with one or more nodes of computer system 500 through a wired or wireless connection, such as over network interface 540.

Those skilled in the art will appreciate that computer system 500 is merely illustrative and is not intended to limit the scope of the present disclosure. In particular, computer system 500 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system for determining occupancy within a space, the system comprising:

at least one processor; and memory storing instructions executable by the at least one processor, the instructions when executed cause the system to:

obtain information related to presence of a user within a space;

obtain information related to one or more RF signals within the space;

associate the one or more RF signals with the user based on the information related to presence of the user and information related to the one or more RF signals, the one or more RF signals including RF signals emitted by one or more user devices;

assign a weight factor to the RF signals based on a type of the user device emitting the RF signals; and determine presence of the user based on association of the user with the one or more weighted RF signals.

2. The system of claim 1, wherein associating the one or more RF signals with the user is based on the space and wherein the instructions when executed cause the system to associate the one or more RF signals with the user and the space.

3. The system of claim 2, wherein the instructions when executed cause the system to: determine presence of the user in a given space in a given time based on detecting the one or more RF signals.

4. The system of claim 1, further comprising:

one or more sensors configured to output signals conveying information related to the user, and wherein the instructions when executed cause the system to:

detect presence of the user within the space based on the output signals; and associate the one or more RF signals with the user based on the detected presence.

5. The system of claim 4, wherein the one or more sensors are configured to output signals conveying information related to RF signals within the space, and wherein the instructions when executed cause the system to:

detect one or more RF signals within the space based on the output signals; and associate the one or more RF signals with the user based on the detected RF signals.

6. The system of claim 5, wherein the instructions when executed cause the system to: detect the one or more RF signals responsive to detecting the user within the space.

7. A method for determining occupancy within a space, the method being implemented in a computing system comprising at least one processor and memory storing instructions, the method comprising:

obtaining information related to presence of a user within a space; obtaining information related to one or more RF signals within the space, the RF signals including RF signals generated by one or more user devices;

associating one or more RF signals with the user based on the information related to presence of the user and information related to the one or more RF signals;

assigning a weight factor to the RF signals based on a type of the user device emitting the RF signals; and determining presence of the user based on the association of the user with the one or more weighted RF signals.

8. The method of claim 7, wherein: associating the one or more RF signals with the user is based on the space and wherein the instructions when executed cause the system to associate the one or more RF signals with the user and the space.

9. The method of claim 8, further comprising: determining presence of the user in a given space in a given time based on the one or more RF signals.

10. The method of claim 7, wherein the computing system comprising further comprises one or more sensors, the method further comprising:

detecting presence of the user within the space based on output signals from the one or more sensors; and associating the one or more RF signals with the user based on the detected presence.

11. The method of claim 10, further comprising:

detecting one or more RF signals within the space based on output signals from the one or more sensors; and associating the one or more RF signals with the user based on the detected RF signals.

12. The method of claim 11, further comprising: detecting the one or more RF signals responsive to detecting the user within the space.

13. A system for determining occupancy within a space, the system comprising:

one or more sensors configured to output signals conveying information related to a user and information related to one or more RF signals within a first space;

at least one processor; and memory storing instructions executable by the at least one processor, the instructions when executed cause the system to:

detect presence of the user within the first space based on the output signals;

detect a plurality of RF signals within the first space based on the output signals, the plurality of RF signals including RF signals generated by one or more user devices;

associate one or more RF signals from the detected plurality of RF signals with the detected user, the one or more RF signals being emitted by one or more user devices of the user;

assign a weight factor to the RF signals based on a type of the user device emitting the RF signals; and determine presence of the user in a second space based on detecting the weighted RF signals in the second space.

\* \* \* \* \*